United States Patent [19]
Cheng

[11] Patent Number: 5,265,338
[45] Date of Patent: Nov. 30, 1993

[54] PEELING DEVICE FOR CABLE

[76] Inventor: Yin-Ho Cheng, No. 1, Alley 78, Lane 379, Chung Hwa Rd., Shulin Town, Tapiei Hsien, Taiwan

[21] Appl. No.: 51,341

[22] Filed: Apr. 23, 1993

[51] Int. Cl.$^5$ .................. B26B 27/00; B21F 11/00; B21F 13/00
[52] U.S. Cl. ........................... 30/90.1; 30/91.2; 30/91.1
[58] Field of Search ............ 30/90.1, 90.2, 90.4, 30/91.2, 92, 286; 81/9.4

[56] References Cited

U.S. PATENT DOCUMENTS

| | | | |
|---|---|---|---|
| 4,526,068 | 7/1985 | Undin et al. | 30/90.1 |
| 4,805,301 | 2/1989 | Chapin et al. | 30/90.1 |
| 4,829,671 | 5/1989 | Cheng | 30/90.1 |
| 4,932,091 | 6/1990 | Krzyzanski | 30/90.1 |
| 4,955,137 | 9/1990 | Matthews | 30/90.1 |

*Primary Examiner*—Bruce M. Kisliuk
*Assistant Examiner*—Paul M. Heyrana, Sr.

*Attorney, Agent, or Firm*—Morton J. Rosenberg; David I. Klein

[57] ABSTRACT

This invention relates to a peeling device for cable which can hold various diameter of cables by adjusting the height of its V-shape cable holder, furthermore the angle of cutter of this peeling device can be changed so as to do a radial cutting, spiral cutting or an axial straight cutting, the invention being composed of an outer shell, a V-shape cable holder, a cutter seat, an adjusting cover, a torsion spring, an adjusting bolt and a tension spring, wherein the outer shell being composed of two semi-shells, the adjusting cover being screwed into the cutter seat, the cutter being enclosed by a spring and installed inside the adjusting cover so as to adjust the extending length of the cutter by turning the adjusting cover, on side wall of the cutter seat having a thumb rod which extending out from the fixing groove of the outer shell and can be positioned in some position so as to change the angle of the cutter to do a radial cutting, a spiral cutting or an axial straight cutting.

3 Claims, 4 Drawing Sheets

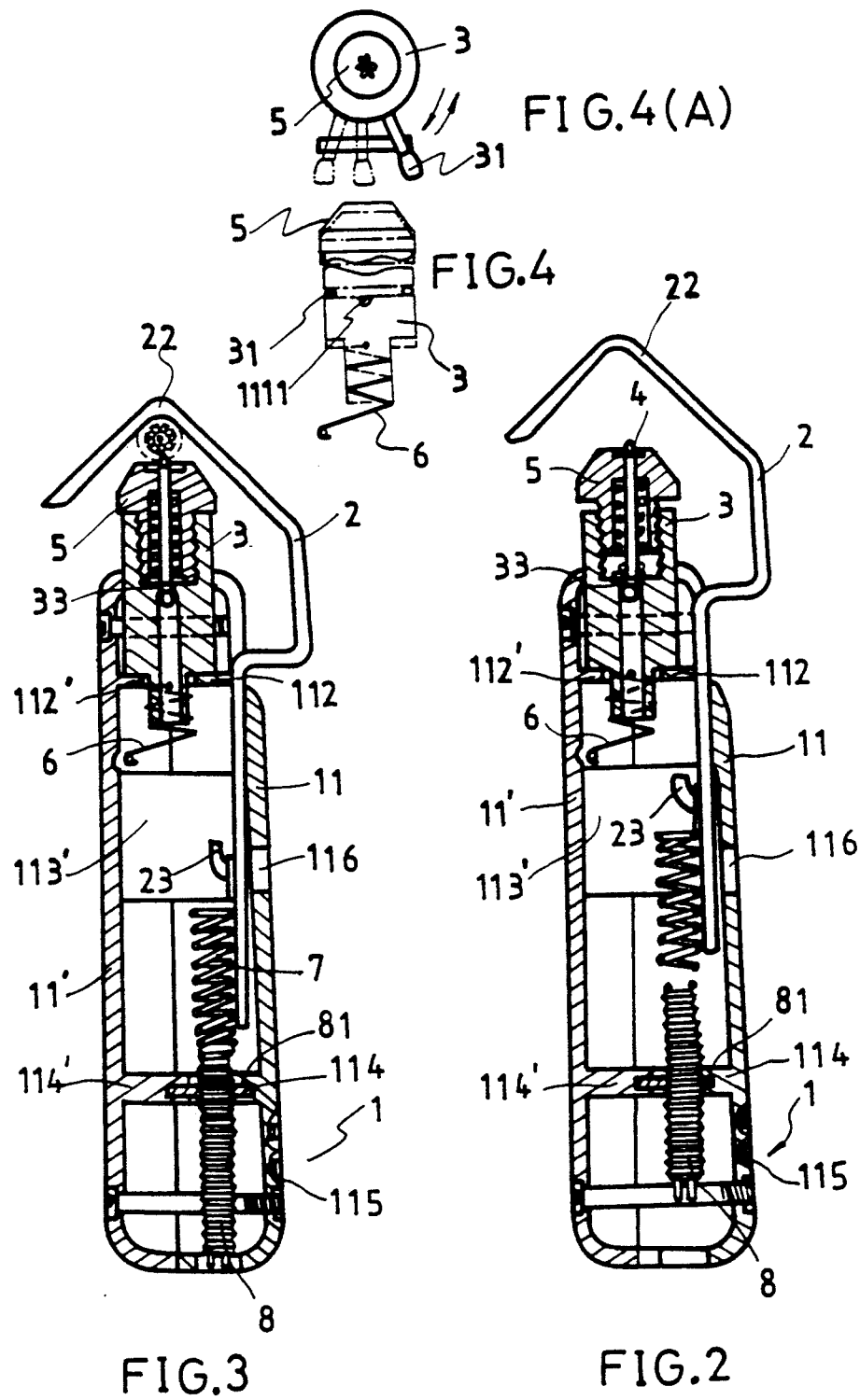

PEELING DEVICE FOR CABLE

BACKGROUND OF THE INVENTION

This invention relates to a peeling device for cable, particularly a peeling device which can hold various diameter of cables by adjusting the height of its V-shape cable holder, furthermore the angle of cutter of this peeling device can be changed so as to do a radial cutting, spiral cutting or an axial straight cutting.

The conventional peelers used for peeling the outer cover of cable always have the following disadvantages: (1) It is impossible for the conventional peelers to hold various diameter of cables, these kind of peelers only can be used for holding single diametric dimension, that is very inconvenient for user. (2) The angle of cutter of the conventional cable peelers can not be positioned, therefore these kind of peelers only can do single directional cutting, operator must use his finger to hold the cutter to change the cutting angle, that is difficult for user to hold the cutter in a stable position.

SUMMARY OF THE INVENTION

It is therefore the main object of this invention to provide a peeling device for cable, the angle of cutter of the peeling device can be changed and positioned in some positions so as to do a spiral cutting or an axial straight cutting, furthermore the thumb rod can be returned to original place by means of a torsion spring so as to do a radial cutting.

It is a further object of this invention to provide a peeling device for cable which can hold various diameter of cable by means of adjusting the height of the V-shape cable holder.

BRIEF DESCRIPTION OF THE DRAWINGS

For purpose of promoting an understanding of the principles of the invention, reference will be made to the embodiment illustrated in the drawings:

FIG. 2 is a sectional view of the invention;

FIG. 3 is a sectional view showing the status of this invention holding a cable;

FIG. 4 and FIG. 4(A) are plan views showing the setting position of thumb rod and the relative position the cutter of this invention;

DETAILED DESCRIPTION OF THE PREFERRED EMBODIMENT

Figure 1:
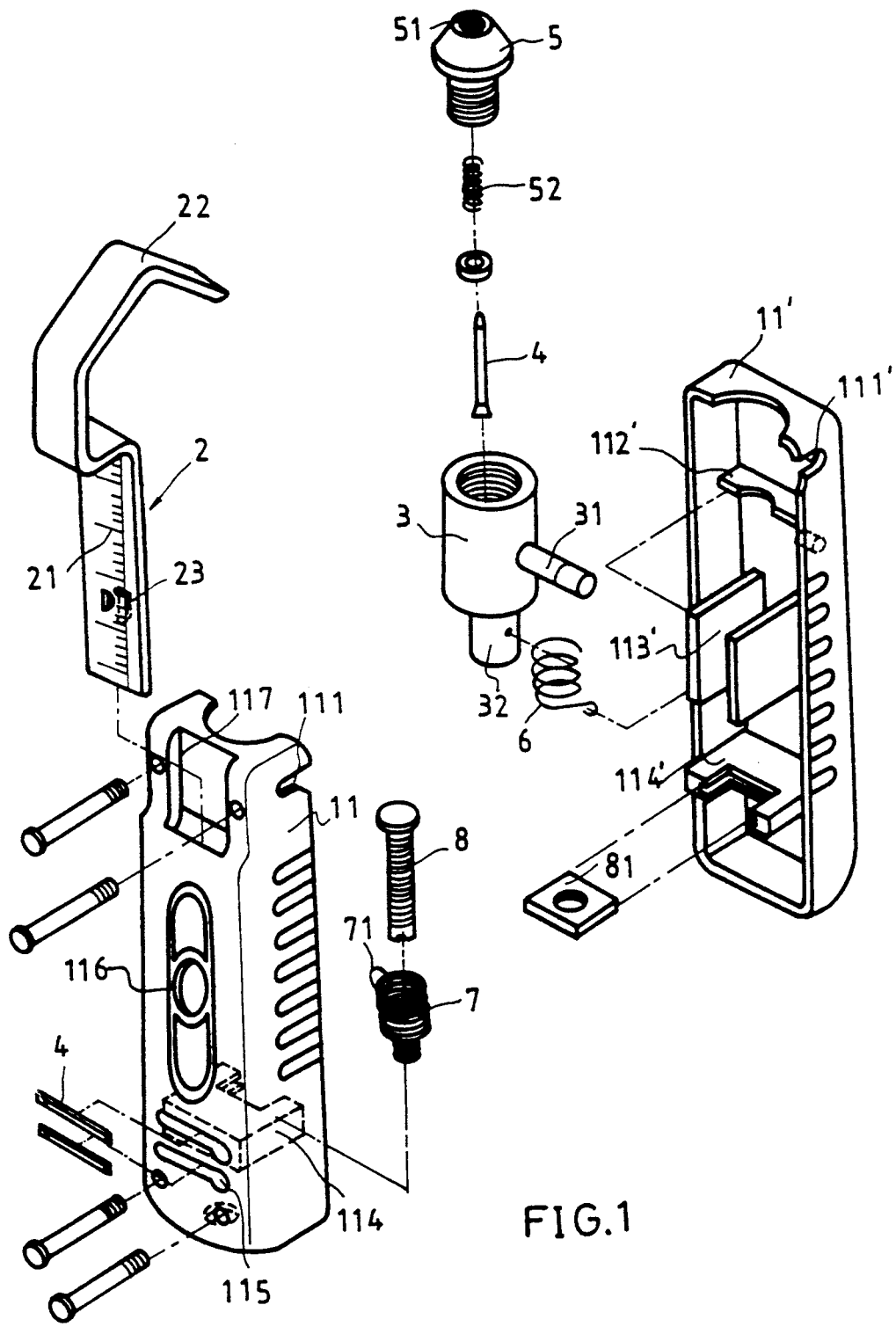
FIG. 1 is a perspective exploded view of the invention.

Referring to FIG. 1–FIG. 3, this peeling device for cable, comprises an outer shell (1), a V-shape cable holder (2), a cutter seat (3), a cutter (4), an adjusting cover (5), a torsion spring (6), a tension spring (7) and an adjusting bolt (8). Wherein the shell (1) is composed of a first semi-shell (11) and a second semi-shell (11'), the two semi-shells (11) (11') having respectively a fixing groove (111), (111'), a fixing plate (112) (112') and a fixing base (114) (114'). The first semi-shell (11) has a spare cutter groove (115), a scale view window (116) and an aperture (117) formed at its side wall, inside the second semi-shell (11') having a stop plate (113'). The cutter seat (3) has a female thread formed therein which the adjusting cover (5) can be screwed into, at the bottom of the cutter seat (3) having a fixing part (32) which can be positioned on the fixing plates (112) (112'). The cutter (4) being encircled by a spring (52) which is installed inside the adjusting cover (5), the top end of the cutter (4) extending out from a through hole (51) of the adjusting cover (5) and the bottom of the cutter (4) being positioned at a cutter groove (33) which is formed therein the botton of the adjusting cover (5), the extending length of the cutter (4) can be adjusted by turning the adjusting cover (5). One end of the torsion spring (6) is fixed on the fixing part (32) of the cutter seat (3), the other end is fixed on the wall of the second semi-shell (11'). The lower part of the V-shape cable holder (2) is inserted into the first semi-shell (11) from the aperture (117) and connected with a hook ring (71) of the tension spring (7) by means of its hook (23), furthermore the lower side wall of the V-shape cable holder (2) having a scale (21) and being supported by the stop plate (113'), the upper part of the V-shape cable holder (2) being formed into inverted V-shape clamping part (22) so as to clamp cable, in addition, the end of the tension spring (7) having a smaller diameter so as to connect with the adjusting bolt (8), the adjusting bolt (8) being screwed into a thread seat (81) which is fixed on the fixing bases (114) (114'), therefore the height of the V-shape cable holder (2) can be adjusted by means of the adjusting bolt (8) and the tension spring (8) so as to clamp various diameter of cables.

Figure 5A:
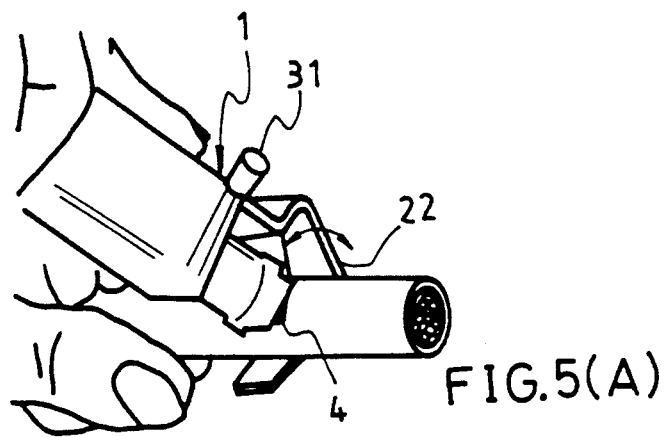
FIGS. 5(A), 5(B), 5(C) are perspective views showing three kind of cutting modes of the invention.
Figure 5B:
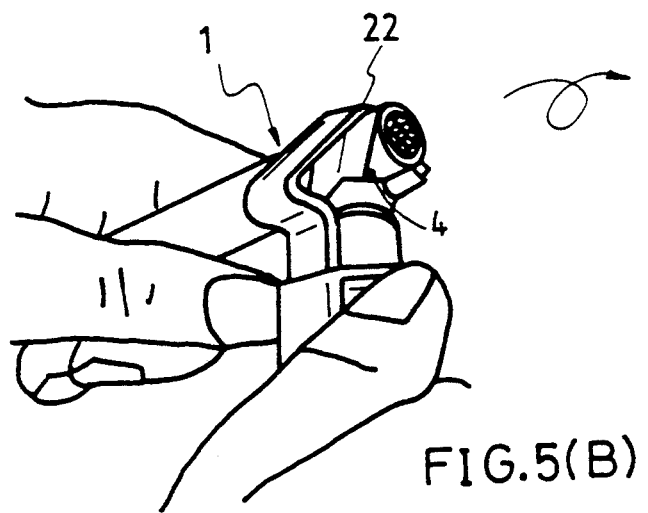
Figure 5C:
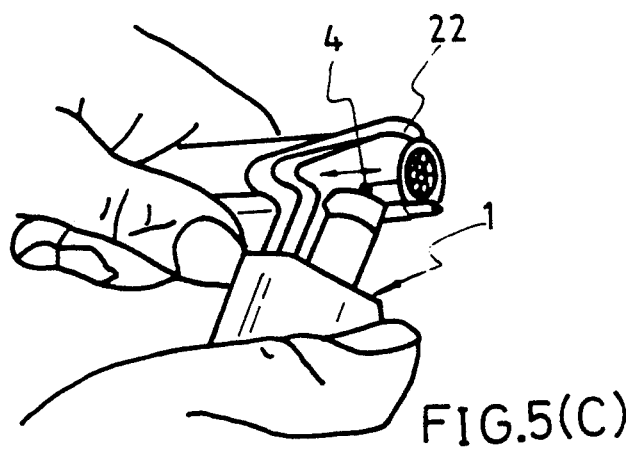
Figure 6:
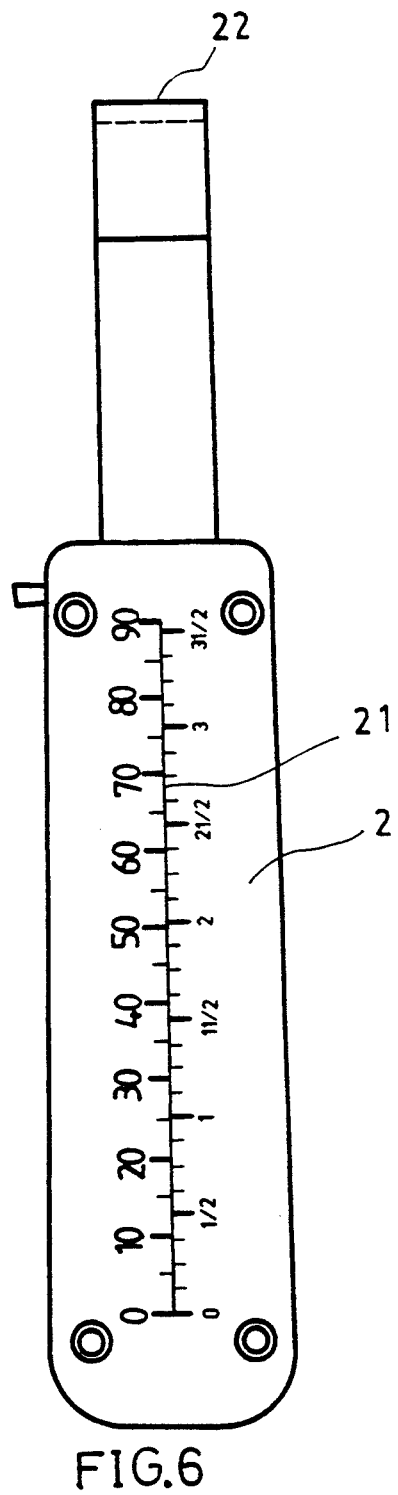
FIG. 6 is a detailed plan view showing the V-shape cable holder of the invention.

Referring to FIG. 4, FIG. 4(A), the cutter seat (3) have a thumb rod (31) formed at its side wall, the thumb rod (31) extending out form the fixing grooves (111) (111') and being retained at the right side of the fixing grooves (111) (111') by means of the torsion spring (6), when the thumb rod (31) being slided and positioned at the center notch (1111) of the fixing grooves (111) (111'), the cutter (4) being in 45 degree position and can do a spiral cutting, such as shown in FIG.(B), when the thumb rod (31) being positioned on left side by fingers, the cutter (4) being in 90 degree position and can do an axial straight cutting, such as shown in FIG. 5(c), when the thumb rod (31) departs from the notch (1111) or releases, the thumb rod (31) can be returned to right side of the fixing grooves (111) (111') and the cutter (4) being in horizontal position so as to do a radial cutting, such as shown in FIG. 5(A). In addition, the height of the V-shape cable holder (2) can be adjusted according to diameter of cable and the scale (21) can be read from the scale view window (116).

It is understood by those skilled in the art that the foregoing description is a preferred embodiment of the disclosed device and that various changes and modifications may be made in the invention without departing from the spirit and scope thereof.

What is claimed is:

1. A peeling device for cable comprising:
    an outer shell being composed of a first semi-shell and a second semi-shell, said two semi-shells having respectively a fixing groove, a fixing plate and a fixing base, said first semi-shell having a spare cutter groove, a scale view window and an aperture formed at its side wall, inside said second semi-shell having a stop plate and the center of said two fixing grooves form a notch;
    a cutter seat having a female thread, at a bottom of said cutter seat having a fixing part which can be installed on said two fixing plates, at a side wall of said cutter seat having a thumb rod extending out from said two fixing grooves;

an adjusting cover which can be screwed into the female thread of said cutter seat;

a cutter being enclosed by a spring and installed inside said adjusting cover, the top end of said cutter extending out from a through hole formed at the top of said adjusting cover;

a torsion spring, one end of said torsion spring being fixed on the fixing part of said cutter seat, the other end being fixed on an inner wall of second said semi-shell so as to retain said thumb rod at the right side of said two fixing grooves;

a V-shape cable holder being inserted into said first semi-shell from said aperture, at a lower part of said V-shape cable holder having a scale and a hook;

a tension spring having a hook ring which can be connected with the hook of said V-shape cable holder, the end of said tension spring having a smaller diameter part;

an adjusting bolt which can be inserted into and positioned on the smaller diameter part of said torsion spring, said adjusting bolt being screwed into a thread seat being fixed on said two fixing bases;

the above structure characterized in that when said thumb rod is positioned at the center notch of said fixing grooves, said cutter being in a 45 degree position relative to an axis of a cable being cut and can do spiral cutting, when the thumb rod is pulled and positioned at the left side of said fixing grooves, said cutter being moved together with said cutter seat and can do an axial straight cutting relative to an axis of a cable being cut once said thumb rod departing from said notch or releasing, said thumb rod would be returned to the right side of said fixing grooves by means of said torsion spring so as to do a radial cutting.

2. A peeling device for cable as claimed in claim 1, wherein the height of said V-shape cable holder above the cutter can be adjusted by turning said adjusting bolt to pull the tension spring so as to adjust the height of said V-shape cable holder for clamping various diameter of cable.

3. A peeling device for cable as claimed in claim 1, wherein an extending length of said cutter above said adjusting cover can be adjusted by means of turning said adjusting cover.

* * * * *